(12) United States Patent
Ikeda

(10) Patent No.: US 6,922,275 B2
(45) Date of Patent: Jul. 26, 2005

(54) ELECTROPHORETIC DISPLAY

(75) Inventor: Tsutomu Ikeda, Hachiohji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/696,170

(22) Filed: Oct. 28, 2003

(65) Prior Publication Data

US 2004/0145561 A1 Jul. 29, 2004

(30) Foreign Application Priority Data

Oct. 31, 2002 (JP) .......................................... 2002-318998
Aug. 25, 2003 (JP) .......................................... 2003-300533

(51) Int. Cl.⁷ .......................... G02B 26/00; G09G 3/34
(52) U.S. Cl. ..................................... 359/296; 345/107
(58) Field of Search ........................... 345/107; 359/296

(56) References Cited

FOREIGN PATENT DOCUMENTS

| JP | 2002-139749 | 5/2002 |
|---|---|---|
| JP | 2002-244161 | 8/2002 |

*Primary Examiner*—David N. Spector
(74) *Attorney, Agent, or Firm*—Morgan & Finnegan, LLP

(57) ABSTRACT

An electrophoretic display includes a first substrate disposed on a viewer side, a second substrate disposed at a predetermined spacing with the first substrate, a first electrode disposed on the first substrate side, a second electrode disposed on the second electrode side, liquid disposed at the predetermined spacing, and a plurality of charged particles dispersed in the liquid. The charged particles are movable by changing a polarity of a voltage applied between the first and second electrodes to effect display. The second electrode at a pixel has a surface area larger than that of the first electrode at the pixel.

9 Claims, 3 Drawing Sheets (a)

(b)

ELECTROPHORETIC DISPLAY

FIELD OF THE INVENTION AND RELATED ART

The present invention relates to an electrophoretic display which effects display by moving charged particles in liquid.

In recent years, various types of electrophoretic displays for performing display by causing a charged particles (charged migrating particles) to migrate in liquid (insulating liquid) have been proposed. Hereinbelow, the electrophoretic displays will be described.

With development of information equipment, the needs for low-power and thin display apparatuses have grown, so that extensive study and development have been made on display apparatuses fitted to these needs. Of these display apparatuses, a liquid crystal display apparatus has been developed actively as a display apparatus capable of meeting the needs and has been brought into the commercial stage. However, the now-available liquid crystal display apparatus is accompanied with such problems that it has poor viewability of characters on a picture area due to a viewing angle or reflection light and that it can cause severe eyestrain by flickering, low luminance, etc., of a light source. These problems have not been sufficiently solved as yet. For this reason, a reflection type display apparatus has been expected from the viewpoints of low power consumption and reduction in eyestrain.

As one of such reflection type display apparatus, an electrophoretic display has been proposed by Harold D. Lees et al. (e.g., U.S. Pat. No. 3,612,758).

FIG. 7 shows at (a) an embodiment of a sectional structure of such an electrophoretic display. Referring to FIG. 7(a), the electrophoretic display includes a pair of substrates 1 and 2 oppositely disposed with a predetermined spacing, insulating liquid 53 filled in the spacing, a mutiplicity of colored charged migrating particles (electrophoretic display) 54 disposed in the insulating liquid, and display electrodes 55 and 56 disposed on the substrates 1 and 2, respectively, at each pixel. Between adjacent pixels, a partition wall 57 is disposed so as to prevent the colored charged migrating particles 54 from migrating toward another pixel to retain uniform display. In the electrophoretic display, the colored charged migrating particles are charged positively or negatively, so that they are adsorbed by either one of the display electrodes 55 and 56 depending on a polarity of a voltage to be applied between the display electrodes 55 and 56. In this case, the insulating liquid 53 and the colored charged migrating particles 54 are is visually identified when the charged migrating particles 54 are adsorbed by the display electrode 55 on a viewer side (FIG. 7(b)), and the color of the insulating liquid 53 is visually identified when the charged migrating particles 54 are adsorbed by the other display electrode 56 (FIG. 7(a)). As a result, it is possible to display various images by controlling the polarity of applied voltage pixel by pixel.

As described above, the electrophoretic display effects display by utilizing light reflected from a pigment or a dye, so that it becomes possible to provide display qualities closer to paper rather than display. Accordingly, the electrophoretic display is recently promising display apparatus called electronic paper having both the paper like display quality and display rewritable function.

Such an electrophoretic display is, however, accompanied with such problems that incident light passes through the layer of the charged migrating particles 54 in the state of FIG. 7(b) to lower a contrast when a concentration of the charged migrating particles is the pixel is excessively low, and that when the concentration is excessively high, a response speed is lowered.

Further, the electrophoretic display has a gap (distance) between the electrodes (55 and 56) relatively larger than that of the liquid crystal display apparatus, thus being liable to cause leakage of electric field between adjacent pixels. As a result, the electrophoretic display fails to provide a desired display state. This is not particularly problematic in the case of low display definition (resolution) but remarkably deteriorates display qualities when the display definition is increased.

Such a deterioration in display qualities due to electric field interference can be obviated by disposing an electroconductive layer between the adjacent pixels. In the electrophoretic display, the partition wall 57 is generally disposed at a boundary between the adjacent pixels. It is possible to prevent the display quality deterioration caused by the electric field interference by imparting electroconductivity to the partition wall 57 and using the resultant partition wall 57 as a common electrode (e.g., as described in Japanese Laid-Open Patent Application No. 2001-343672).

However, in the structure described in the JP Laid-Open Patent Application, the common electrode has a surface area which is several times as large as that of the pixel electrode, and the display electrode at the partition wall surface has a shorter distance from the pixel electrode when compared with the display surface. Accordingly, when display is effected by attracting the charged migrating particles to the common electrode, most of the charged migrating particles are attached to the partition wall. As a result, there is a possibility that it becomes difficult to provide an original color of the charged migrating particles at the display surface.

SUMMARY OF THE INVENTION

An object of the present invention to provide an electrophoretic display having solved the above-described problems.

According to the present invention, there is provided an electrophoretic display, comprising:

a first substrate disposed on a viewer side, a second substrate disposed at a predetermined spacing with the first substrate, a first electrode disposed on the first substrate side, a second electrode disposed on the second electrode side, liquid disposed at the predetermined spacing, and a plurality of charged particles dispersed in the liquid, the charged particles being movable by changing a polarity of a voltage applied between the first and second electrodes to effect display, wherein the second electrode at a pixel has a surface area larger than that of the first electrode at the pixel.

In each pixel of the electrophoretic display according to the present invention, the surface area of the second electrode is larger than the surface area of the first electrode, it is possible to improve a display contrast without increasing a particle concentration. Further, each pixel is surrounded by the first and second electrodes to be electrically shielded, whereby it becomes possible to reduce an influence of leakage electric field from an adjacent pixel on the pixel. Further, a spacing between the first and second electrodes varies depending on place, so that an electric field between both the electrodes becomes nonuniform. As a result, the electrophoretic display is effective in effecting gradational display.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

The electrophoretic display according to the present invention includes the following embodiments:

(a) each pixel has an inner wall which has been substantially covered with said first and second electrodes,
(b) the first electrode is divide for each pixel,
(c) the first electrode is connected to an associated switching device for each pixel,
(d) the second electrode is divided for each pixel,
(e) the second electrode is connected to an associated switching device for each pixel, and
(f) the charged particles and said liquid are held in a microcapsule.

Hereinbelow, preferred embodiments of the present invention will be described with reference to FIGS. 1–6.

Figure 1:
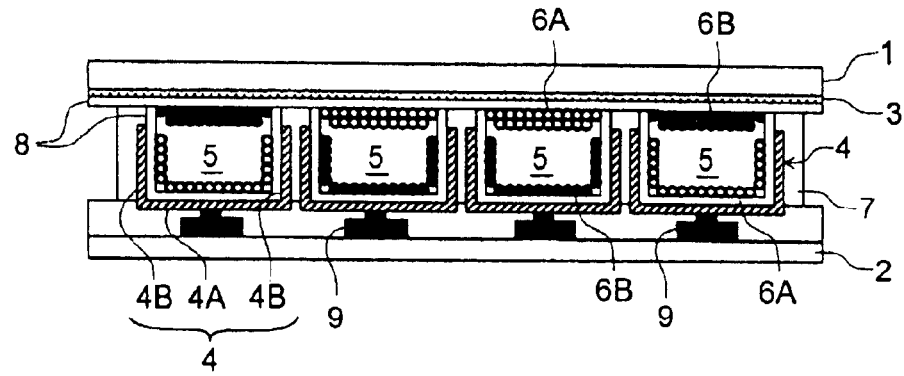
FIGS. 1–6 are respectively a schematic sectional view showing an embodiment of the electrophoretic display to the present invention.

An electrophoretic display of an embodiment of the present invention includes, as shown in FIG. 1, a first substrate 1 disposed on a viewer side, a second substrate 2 disposed at a predetermined spacing with the first substrate 1, a first electrode 3 disposed on the first substrate 1 side, a second electrode 4 disposed on the second 2 electrode side, liquid 5 disposed at the predetermined spacing, and a plurality of charged particles (charged migrating particles) 6A and 6B dispersed in the liquid 5. The charged particles 6A and 6B are moved by changing a polarity of a voltage applied between the first and second electrodes 3 and 4 to effect display. In this embodiment, a surface area of the second electrode 4 (facing the liquid 5) at one (each) pixel (e.g., A1 in FIG. 2) is designed to be larger than that of the first electrode 3 at one (each) pixel. In order to ensure such a relationship, the second electrode 4 may be constituted by a first portion 4A disposed along the second substrate 2 at each pixel and second portions 4B extending from the first portion 4A toward the first substrate 1.

In such a case, each pixel is surrounded by the first electrode 3 and the second electrode 4, thus being electrically shielded. By doing so, it becomes possible to reduce an influence of leakage electric field from an adjacent pixel. Further, at each pixel, areas of the second electrode 4 and the first electrode 3 viewed from a viewer side, i.e., so-called visible cross-sectional areas of the second electrode 4 and the first electrode 3 are set to be substantially identical to each other.

Figure 2:
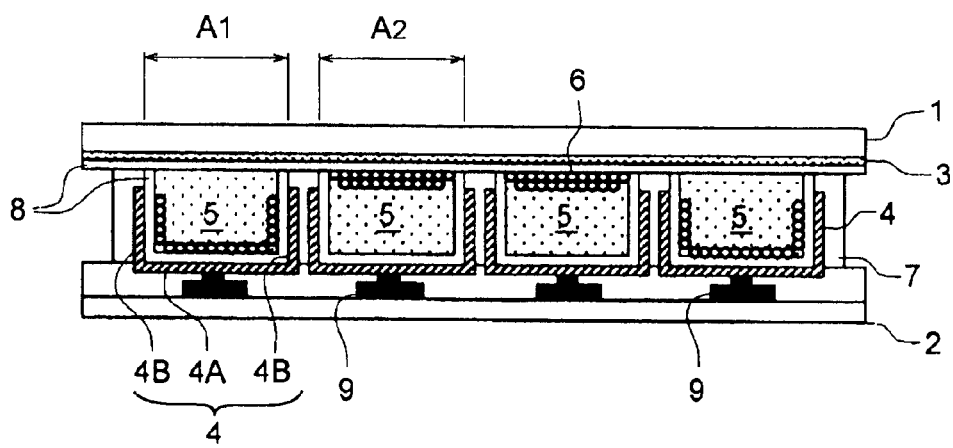

Incidentally, in the embodiment shown in FIGS. 1 and 2, the second electrode 4 has such a pam shape that the charged migrating particles 6A and 6B are surrounded by the second electrode 4 in a vertical cross-section direction connecting the first and second substrates 1 and 2.

At a boundary between adjacent pixels, a partition wall 7 is disposed, and the second portions 4B may be disposed along the partition wall 7. The partition wall 7 may be disposed so as to retain a constant gap between the first and second substrates 1 and 2 or block movement of the liquid 5 and/or the charged migrating particles 6A and 6B to an adjacent pixel.

In this embodiment, the first substrate 1 and the first electrode 3 may be made transparent.

At the respective surfaces of the first and second electrodes 3 and 4, an insulating layer 8 may be formed, thus preventing electric charge injection from the respective electrodes to the charged migrating particles 6 (6A, 6B).

In the case where the first electrode 3 at each pixel is used as a common electrode for all the pixels, the second electrode 4 at each pixel may preferably be designed so as to be not connected with an adjacent second electrode (of an adjacent pixel) and be independently supplied with a different voltage. Each of the second electrodes 4 may be connected with a switching element 9, such as a TFT (thin film transistor), for active matrix drive display. On the other hand, in the case where the second electrode 4 at each pixel is used as a common electrode for all the pixels, the first electrode 3 at each pixel may preferably be designed so as to be not connected with an adjacent first electrode (of an adjacent pixel) and be independently supplied with a different voltage. Further, each of the first electrodes 3 may be connected with a switching element 9, such as a TFT for active matrix drive display.

At the respective pixels, two species of charged migrating particles different in charge polarity and color (6A and 6B shown in FIG. 1) may be disposed. For example, in FIG. 1, positive charged white particles 6A and negatively charged black particles 6B are disposed. In this case, the liquid may be transparent.

Further, as shown in FIG. 2, a single species of the charged migrating particles 6, not the two species thereof, may be disposed. For example, black liquid 5 and white charged migrating particles 6 may be used in combination. In this case, when the charged migrating particles 6 are moved to a position where they cover the first electrode 3 (A2 shown in FIG. 2), white display is effected. On the other hand, when the charged migrating particles 6 are moved to a position where they cover the second electrode 4 (A1 shown in FIG. 2), black display is effected. Incidentally, the combination of colors of the charged migrating particles 6 and the liquid 5 may appropriately be changed as desired.

The partition wall 7 shown in FIG. 1 has a width (partially including a width of the second electrode 4 embedded in the partition wall 7) which is substantially equal at any portion over the entire vertical cross section. However, the partition wall 7 may be modified in vertical cross section indicated by a reference numeral 17 such that the width is linearly increased as it comes near the second substrate 2 as shown in FIG. 3 or indicated by reference numerals 27, 37 and 47 such that the width is moderately increased as it comes near the second substrate 2 as shown in FIGS. 4, 5 and 6, respectively.

Based on such modifications, the shape of the second electrode is changed so that an electric field concentration on electrode and portion is alleviated compared with the shape in FIG. 1. As a result, it is possible to further improve controllability and contrast in gradational display. More specifically, as shown in FIG. 5, the entire pixel may have a bowl shape. Alternatively, as shown in FIG. 6, the liquid 5 and the charged migrating particles 6 may be encapsulated in a microcapsule 44 and disposed at each pixel. The number of microcapsule to be disposed at each pixel may be two or more and may be disposed on a random basis.

Figure 3:
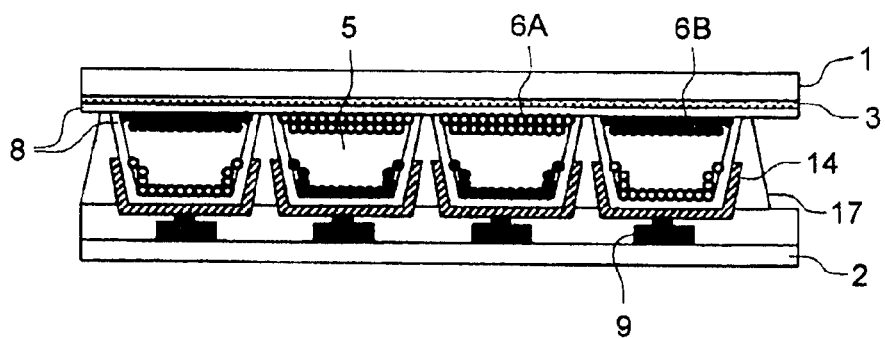
Figure 5:
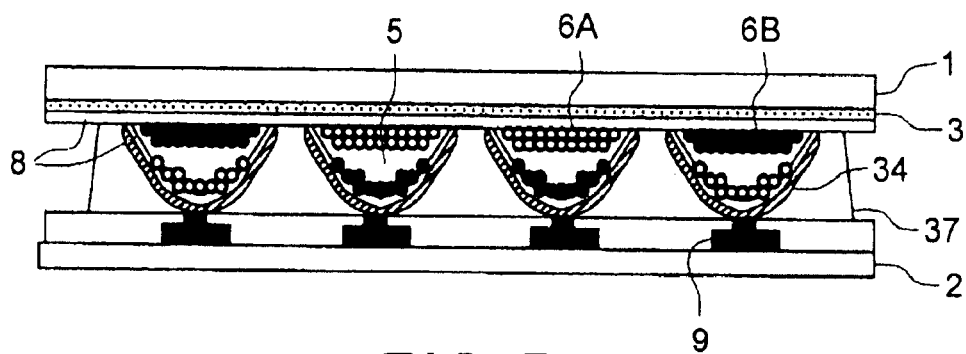
Figure 6:
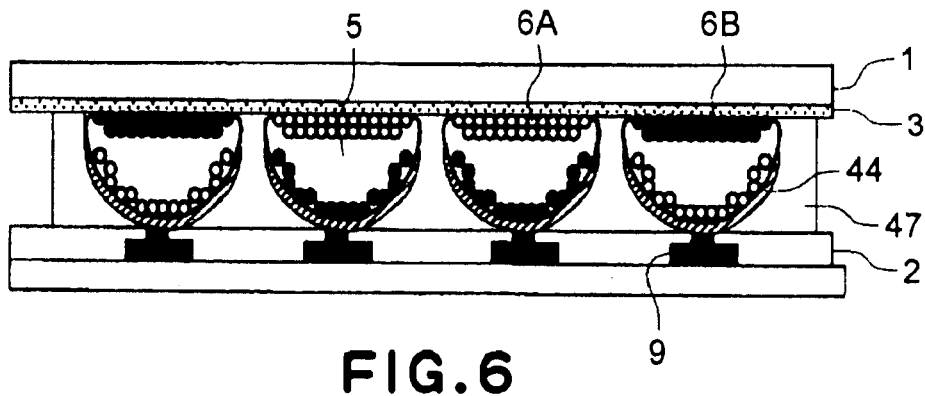
Figure 7:
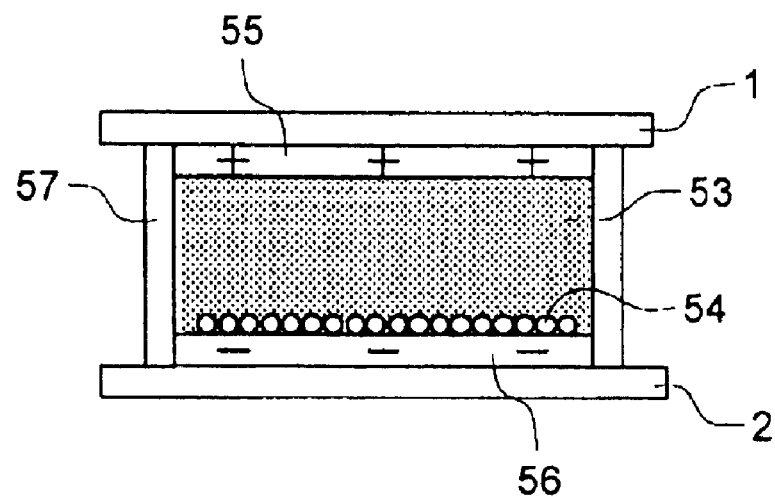
FIG. 7 is a schematic sectional view showing an embodiment of a conventional electrophoretic display.
Figure 7:
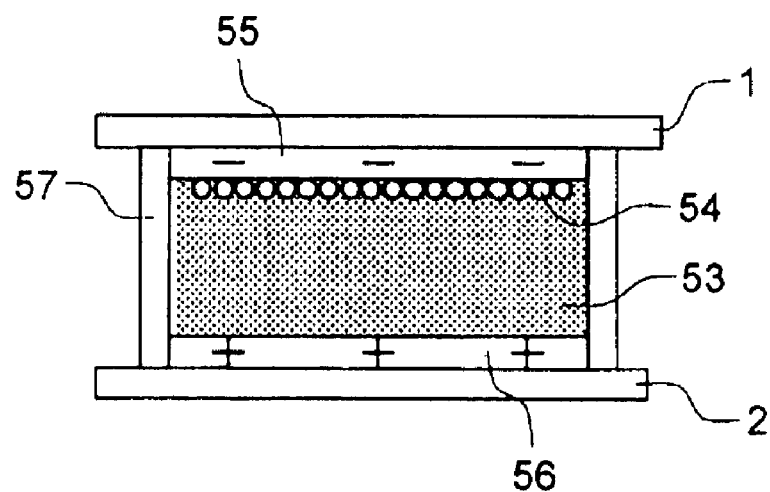

Incidentally, the second electrode 34 shown in FIG. 5 is extended closer to the first substrate 1 but may be disposed as shown in FIGS. 3 and 6. The height of the second electrode may appropriately changed depending on the dimension of pixel and the shape of partition wall so long as it can effectively suppress electric field interference with an adjacent pixel.

Figure 4:
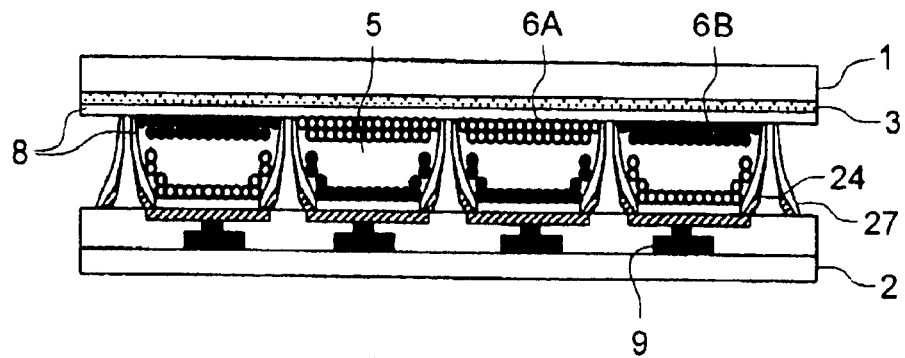

The second electrodes 14 and 24 shown in FIGS. 3 and 4 has a pan shape in vertical cross section connecting the first and second substrates 1 and 2 such that the charged migrating particles 6A and 6B are surrounded by the second electrode (14, 24) when they are attracted to the second electrode (14, 24) and that an opening of the pan shape becomes larger with a distance from the second substrate 2.

As the first and second substrates 1 and 2, it is possible to use a plastic film of PET (polyethylene terephthalate), PC (polycarbonate), PES (polyether sulfone), or the like; glass quartz, etc. As the first substrate 1, it is necessary to use a transparent material as described above but as the second substrate 2, it is also possible to use a colored film of, e.g., PI (polyimide).

The partition wall may be formed through any method. Examples of the method may include one wherein exposure and wet development are performed after application of a photosensitive resin layer, one wherein a separately prepared partition wall member is adhered to a substrate, or one wherein the partition wall is formed by printing process. A method of forming the second electrode (second portion) at the partition wall surface is also not limited. For example, an electroconductive layer is formed at the partition wall surface after the partition wall is formed, and the electroconductive layer is etched so as to be divided for each pixel to provide electrical isolation between adjacent pixels.

As a material for the first electrode, it is possible to use an ordinarily used transparent conductive material.

As a material for the second electrode, any patternable material may be used. For example, it is possible to use metals, such as titanium (Ti), aluminum (Al), copper (Cu), etc.; carbon; silver paste; an organic electroconductive film; and so on.

As the liquid 5, it is possible to use a nonpolar solvent such as isoparaffin, silicone oil, xylene, toluene or the like. In the case of coloring the liquid, a dye or pigment for a desired color may be added. As the charged migrating particles, it is possible to employ a material which is colored and possesses a good positively or negatively chargeable performance. Examples of the material for the charged migrating particles, various inorganic or organic pigments, carbon black and resins containing the pigments may be used. The charged migrating particles may ordinarily have a particle size of 0.01–50 μm, preferably 0.1–10 μm.

In the above-mentioned liquid or charged migrating particles, a charge control agent for controlling and stabilizing chargeability of the charged migrating particles may be added. Examples of such a charge control agent include metal complex salts of monoazo dyes, salicylic acid, organic quaternary ammonium salts, nigrosin based compounds.

According to this embodiment, the surface area of the second electrode 4 at each (one) pixel is set to be larger than that of the first electrode 3 at each (one) pixel, so that it becomes possible to improve a display contrast without increasing a particle concentration.

Further, each pixel is surrounded by the first and second electrodes 3 and 4, thus being electrically shielded. As a result, it becomes possible to reduce an influence of leakage electric field from an adjacent pixel.

In addition, a distance between the first and second electrodes 3 and 4 varies from place to place, so that an electric field applied becomes nonuniform, thus being advantageous in terms of gradational display.

Hereinbelow, the present invention will be described more specifically based on Examples.

EXAMPLE 1

An electrophoretic display shown in FIG. 1 was prepared.

Referring to FIG. 1, the electrophoretic display includes a transparent display substrate (first substrate) 1 to be disposed on a viewer side, a rear substrate (second substrate) 2 disposed at a predetermined spacing with he display substrate 1, a transparent common electrode (first electrode) 3 disposed on the almost entire surface of the display substrate 1, a plurality of pixels each including a pixel electrode (second electrode) 4, liquid 5, and charged migrating particles 6A and 6B, and a partition wall member 7 disposed at a boundary between adjacent pixels. The pixel electrode 4 includes a (first) portion 4A disposed along the rear substrate 2 and (second) portions 4B disposed along the partition wall member 7. These portions 4A and 4B are designed so that a surface area (facing to the liquid 5) of the pixel electrode 4 (4A and 4B) at each pixel is larger than that of the common electrode 3.

Each pixel of the electrophoretic display had a size of 80 μm×80 μm, and the partition wall member 7 had a width of 10 μm and a height of 20 μm.

The electrophoretic display was prepared in the following manner.

On a 1.1 mm-thick glass substrate as the rear substrate 2, a switching device 9 and other members (not shown) for driving the electrophoretic display, such as wiring, IC (integrated circuit) and a passivation layer, were formed.

On the rear substrate 2, the partition wall 7 and the pixel electrode 4 were successively formed in a shape as shown in FIG. 1. In this state, the switching device 9 and the pixel electrode 4 were electrically connected to each other at each pixel.

Then, an insulating layer 8 was formed on the pixel electrode 4 so as to cover it.

At each pixel, liquid 5 and charged migrating particles 6 were filled. As the liquid 5, isoparaffin (trade name: "Isoper", mfd. by Exxon Corp.) was used. As the charged migrating particles 6, a mixture of black polystyrene-polymethylmethacrylate copolymer particles (particle size: 1–2 μm) containing carbon black with a surface-treated titanium oxide particles (particle size: 1–2 μm) was used. In the liquid 5 (isoparaffin), succinimide (trade name: "OLOA 1200", mfd. by Chevron Corp.) as a charge control agent was added in advance.

On the other hand, on the display substrate 1, the common electrode 3 and the insulating layer 8 were formed. The display substrate 1 was adhered to the partition wall member 7 to seal the respective pixels.

Thereafter, a controller, a power supply and so on were connected to the electrophoretic display to provide a display apparatus.

The resultant display apparatus provide a high contrast without lowering a response speed when compared with a conventional electrophoretic display. Further, it become also possible to suppress display disorder due to leakage electric field from an adjacent pixel.

EXAMPLE 2

An electrophoretic display shown in FIG. 2 was prepared in the same manner as in Example 1 except that the isoparaffin was changed to isoparaffin ("Isoper", mfd. by Exxon Corp.) containing a blue dye and that the charged migrating particles 6 were changed to a surface-treated titanium oxide particles (particle size: 1–2 μm).

The resultant electrophoretic display achieved the same effects as in Example 1.

EXAMPLE 3

An electrophoretic display shown in FIG. 6 was prepared in the same manner as in Example 1 except that each pixel was prepared in the following manner.

A partition wall member 47 was formed to leave a bowl shape at each pixel portion in a vertical cross section. A second electrode was formed at an inner surface of the partition wall member 47 for each pixel and was electrically connected to an associated switching device 9. At each pixel, a microcapsule containing white particles, black particles and liquid was disposed. In this case, for each pixel, two or more microcapsules may be disposed.

The resultant electrophoretic display achieved the same effects a in Example 1.

As described hereinabove, according to the electrophoretic display of the present invention, at each pixel, the surface area of the second electrode is set to be larger than the surface area of the first electrode, it is possible to improve a display contrast without increasing a particle concentration. Further, each pixel is surrounded by the first and second electrodes to be electrically shielded, whereby it becomes possible to reduce an influence of leakage electric field from an adjacent pixel on the pixel. Further, a spacing between the first and second electrodes varies from place to place, so that an electric field between both the electrodes becomes nonuniform, thus being and advantageous in terms of gradational display.

While the invention has been described with reference to the structures disclosed herein, it is not confined to the details set forth and this application is intended to cover such modifications or changes as may come within the purposes of the improvements or the scope of the following claims.

What is claimed is:

1. An electrophoretic display, comprising:
    a first substrate disposed on a viewer side,
    a second substrate disposed at a predetermined spacing with said first substrate,
    a first electrode disposed on said first substrate side,
    a second electrode disposed on said second electrode side,
    liquid disposed at the predetermined spacing, and
    a plurality of charged particles dispersed in the liquid, said charged particles being movable by changing a polarity of a voltage applied between said first and second electrodes to effect display,
    wherein said second electrode is constituted by a first portion along said second substrate and a second portion extending from the first portion toward said first substrate.

2. A display according to claim 1, wherein said each pixel has an inner wall which has been substantially covered with said first and second electrodes.

3. A display according to claim 1, wherein said first electrode is divided for a pixel.

4. A display according to claim 3, wherein said first electrode is connected to an associated switching device for the pixel.

5. A display according to claim 1, wherein said second electrode is divided for a pixel.

6. A display according to claim 5, wherein said second electrode is connected to an associated switching device for the pixel.

7. A display according to claim 1, wherein said charged particles and said liquid are held in a microcapsule.

8. A display according to claim 1, wherein an insulating layer is disposed at the surfaces of said first and second electrodes.

9. A display according to claim 1, wherein said charged particles are surrounded by said first electrode and said second electrode.

* * * * *